United States Patent [19]

Rekers

[11] 4,431,497
[45] Feb. 14, 1984

[54] RADIATION-STABLE POLYOLEFIN COMPOSITIONS

[75] Inventor: John W. Rekers, Spartanburg, S.C.

[73] Assignee: Milliken Research Corporation, Spartanburg, S.C.

[21] Appl. No.: 316,457

[22] Filed: Oct. 30, 1981

[51] Int. Cl.$^3$ .......................... C08K 5/10; C08K 5/06; C08K 5/05; C08F 8/00
[52] U.S. Cl. ................................ 204/159.2; 524/299; 524/369; 524/384
[58] Field of Search ....................... 524/369, 384, 299; 204/159.2; 523/124, 125, 126; 252/404, 407; 568/809, 660; 560/254

[56] References Cited

U.S. PATENT DOCUMENTS

| | | | |
|---|---|---|---|
| 2,906,727 | 9/1959 | Gordon | 524/384 |
| 3,537,967 | 11/1970 | Kelley et al. | 204/159.2 |
| 3,940,325 | 2/1976 | Hirao | 204/159.2 |
| 4,036,719 | 7/1977 | Lyons | 204/159.2 |
| 4,101,720 | 7/1978 | Taylor et al. | 523/126 |

FOREIGN PATENT DOCUMENTS 1001945 8/1965 United Kingdom .

OTHER PUBLICATIONS

N. S. Allen & K. O. Fatinikun "Thermal and Photo-Sensitized Oxidation of Polypropylene: Influence of Hindered Piperidine Compounds"–Polymer Degradation and Stability 3 (1980–1981) 243–252, Applied Science Publishers Ltd. England.

*Primary Examiner*—Veronica P. Hoke
*Attorney, Agent, or Firm*—Terry T. Moyer; H. William Petry

[57] ABSTRACT

An olefinic polymer composition is provided which comprises an olefinic polymer selected from homopolymers and copolymers made from aliphatic, ethylenically unsaturated monomers containing from 2 to about 10 carbon atoms and from about 100 to about 10,000 ppm of a stabilizer selected from benzhydrol or benzhydrol derivative compound of the formula:

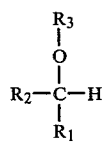

wherein $R_1$ and $R_2$ are each independently selected from an aromatic group having from 6 to about 26 carbon atoms, and $R_3$ is selected from hydrogen, an alkyl group having from 1 to about 20 carbon atoms, or an acyl group having from about 2 to 20 carbon atoms.

9 Claims, No Drawings

RADIATION-STABLE POLYOLEFIN COMPOSITIONS

The present invention relates to compositions of olefinic polymers suitable for high energy radiation treatment. More particularly, the present invention relates to olefinic polymer compositions which are stable to sterilizing dosages of high energy radiation such as gamma radiation.

Olefinic polymers, such as polyethylene and polypropylene, have a wide variety of known end use applications. Recently, as disclosed for instance in U.S. Pat. No. 3,940,325 to Hirao (Chisso), olefinic polymers have been disclosed to be useful in the manufacture of shaped articles for medical uses and for food packaging uses where the articles must undergo sterilization or be disinfected. It has also been reported that sterilization of such shaped articles may advantageously be accomplished by irradiating the article with high energy radiation such as gamma radiation.

Notwithstanding the significant known advantages of sterilization by means of high energy radiation, several disadvantages are known to be associated with such sterilization techniques. First, when treated with radiation energy in an amount sufficient to achieve the desired sterilization, such polyolefin compositions may become discolored. As reported in U.S. Pat. No. 3,537,967 to Kelly et al. (Dart Industries), this coloration may occur for a variety of reasons such as the use of certain additives in the polymer, as well as the presence of high amounts of catalytic residues such as titanium and chlorine. Simple removal of the additives from the olefinic polymer composition has not been found to be a satisfactory solution to the problem because, as reported by Hirao, while polymers which do not contain the standard additives may not be subject to such coloration, the physical properties of the shaped articles made from such polymers after irradiation with, for instance, x-rays may be disadvantageously degraded.

Some of the most common additives found in polyolefin polymer compositions to be made into shaped articles, especially where increased melt temperatures or higher melt index polymers are required, are the so-called primary antioxidants employed to retard radical chain oxidation. The most common primary antioxidants are phenolic in nature. Examples include Goodrite 3114 and 3125 which are phenolic antioxidants available from B. F. Goodrich Chemical Company. When used at effective concentrations to provide both processing and radiation stability these compounds have been found to cause the shaped article, which has been irradiated with a sterilizing dose, to be unacceptably discolored.

Accordingly, it would be highly desirable to provide olefinic polymer compositions which may be made into shaped articles that may be irradiated with sterilizing amounts of radiation while minimizing or eliminating undesirable discoloration or degradation in physical properties. The olefinic polymer compositions and shaped articles made therefrom according to the present invention may be employed to accomplish such desirable results.

According to the present invention an olefinic polymer composition is provided which comprises an olefinic polymer selected from homopolymers and copolymers made from aliphatic, ethylenically unsaturated monomers containing from 2 to about 10 carbon atoms and from about 100 to about 10,000 ppm of a stabilizer selected from benzhydrol or a benzhydrol derivative compound of the formula:

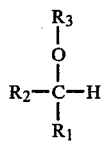

wherein $R_1$ and $R_2$ are each independently selected from an aromatic group having from 6 to about 26 carbon atoms, and $R_3$ is selected from hydrogen, an alkyl group having from 1 to about 20 carbon atoms, or an acyl group having from about 2 to about 20 carbon atoms. Examples of such aromatic groups include phenyl and substituted phenyl groups. Such substituents may be provided in the ortho, meta and/or para positions of the phenyl group and may include alkyl groups of the formula $$C_nH_{2n+1}$$

e.g. methyl, ethyl, isopropyl, tert-butyl, nonyl, dodecyl, or eicosyl groups where n is from 1 to about 20. Examples of alkyl groups which may be employed include methyl, ethyl, isopropyl, tert butyl, nonyl, dodecyl and eicosyl groups. Examples of acyl groups include those of the formula acetyl, propionyol, lauroyl and stearoyl groups.

According to a preferred embodiment of the present invention, the benzhydrol or benzhydrol derivative compounds which may be employed in the olefinic polymer composition may be described as follows:

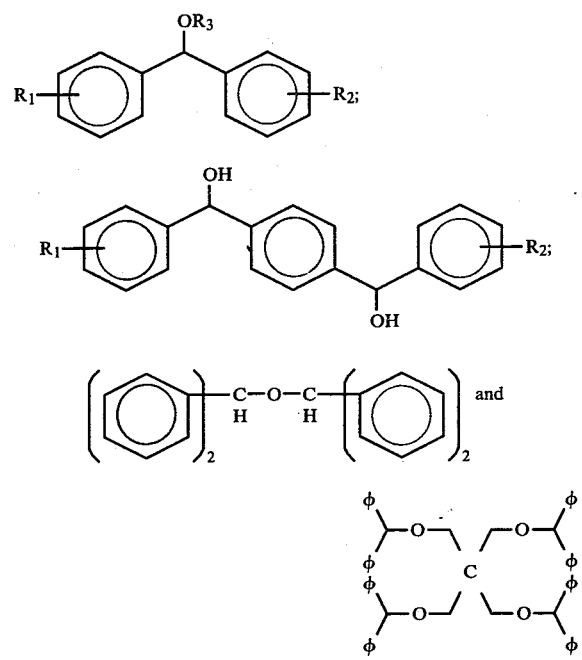

wherein $R_1$ and $R_2$ are independently selected from H or an alkyl group of the formula $C_nH_{2n+1}$ where n is from 1 to about 20; and $R_3$ is selected from hydrogen, an alkyl group having from 1 to about 20 carbon atoms, or an acyl group having from 2 to about 20 carbon atoms.

The stabilizers which may be employed according to the present invention may be very broadly described as having the structural formula set forth above. In general such stabilizers may be employed in an amount of from about 100 to about 10,000 parts per million (ppm) based on the weight of the total composition. Preferably, the amount employed may be from about 500 to about 5,000 ppm. Examples of preferred stabilizers that may be employed include benzhydrol and benzhydrol derivatives such as those set forth in Table I below:

TABLE 1

| Compound | Molecular Weight | Melting Point °C. |
|---|---|---|
| benzhydrol | 184 | 67 |
| O$_2$CHOCHO$_2$ | 350 | 108–110 |
| C(CH$_2$OCHO$_2$)$_4$ | 800 | 135–137 |
| 4,4'-dimethylbenzhydrol | 212 | 67–68 |
| 4,4'-di-t-butylbenzhydrol | 296 | 91–94 |
| Ph–CH(OH)–C$_6$H$_4$–CH(OH)–Ph | 290 | 142–145 |
| t-Bu-C$_6$H$_4$–CH(OH)–C$_6$H$_4$–CH(OH)–C$_6$H$_4$-t-Bu | 402 | 156–158 |

The olefinic polymer compositions of the present invention may include the benzhydrol compound as the sole stabilizer, or the benzhydrol compound may be provided as a stabilizer together with one or more so-called secondary antioxidants or synergists. These secondary antioxidants are known for use in association with phenolic-type primary stabilizers and include a wide variety of compounds which in general may function by converting harmful peroxide compounds present in the polymeric composition to non-harmful, non-radical product. Examples of such secondary antioxidants include dilauryl thiodipropionate, distearyl thiodipopionate, trisnonylphenyl phosphite, dilauryl phosphite, and Weston 618 and Weston 619, which are phosphorus-containing antioxidants available from Borg Warner. In general, such secondary stabilizers may be used in an amount of from about 100 to about 10,000, preferably about 500 to about 3,000 ppm.

It has also been found that the olefinic compositions may contain one or more known, phenolic based, primary stabilizers, such as hindered phenolic-type compounds in addition to the benzhydrol or benzhydrol derivative compound. This is particularly significant since it may not be possible in the practical world to process polypropylene without a phenolic primary antioxidant, the presence of which may lead to yellowing on irradiation. the present invention may provide a remedy for this phenomenon. In such instance, even stabilizers which have been observed to cause discoloration in the polymer composition when subjected to radiation sterilization may not cause such discoloration when the benzhydrol or benzhydrol derivative compound is also present in the composition. When present, such primary stabilizers may be provided in the composition in an amount of from about 100 to about 3,000 ppm, preferably from about 500 to about 2,000 ppm.

Olefinic polymers that may be employed according to the present invention include a wide range of olefinic homopolymers and copolymers of ethylene, propylene, butylene and higher homologues containing up to about 10 carbon atoms. Typically such polymers may have a molecular weight of from about 10,000 to about 500,000, preferably about 30,000 to about 300,000. The preferred polymers applicable for use according to this invention are homopolymers of propylene and random or block copolymers of propylene with other mono-α-olefins such as ethylene, butene-1 and higher homologues containing up to 10 carbon atoms. Blends of such propylene polymers with other polymers such as polyethylene are also included within the scope of this invention. Generally the proportion of ploymerized propylene in the total resin phase of the composition should be at least about 60 percent by weight.

In general, the radiation treatment can be applied to polymers of propylene useful particularly for medical purposes although this particular end use should not be understood to be a limitation upon the scope of the present invention. Thus, for instance, the olefinic polymer compositions of the present invention may be employed for other end uses where such radiation treatment is necessary or desirable, e.g., meat packaging, preserving food in retail packages and other uses.

The high energy radiation treatment of the olefinic polymer compositions of the present invention may include any of a wide variety of known treatment techniques. One convenient radiation source is a cobalt 60 source. Other radiation treatments that may be employed include high energy X-rays, or high energy electrons ($\beta$- radiation). In general, radiation dosages that can be applied may range up to about 5 megarads. For sterilization purposes, a shaped article may be generally sterilized by applying 2.5 megarads under gamma radiation.

The following examples are provided to illustrate the invention but are not to be construed as unduly limiting the subject matter thereof which is defined in the appended claims.

EXAMPLE I

To the Grignard reagent prepared from 47.2 g of p-bromotoluene and 7.2 g of magnesium in 200 ml of ether was added dropwise 30 g of p-tolualdehyde in 50 ml of ether with cooling. When the addition was complete the reaction was refluxed for 15 minutes, cooled in ice, and 40 ml of saturated NH$_4$Cl solution was added dropwise. The reaction was filtered and the ether was removed under reduced pressure to give a yellow oil which crystallized on standing. Recrystallization from petroleum ether gave 26.1 g of nearly colorless 4,4'-dimethylbenzhydrol, m.p. 70°–71°.

EXAMPLE II 4,4'-di-t-butylbenzhydrol was prepared using the procedure of Example I. From 16.7 g of p-bromo-t-butylbenzene, 3.2 g of magnesium, and 17.5 g of p-t-butylbenzaldehyde, there was obtained, after recrystallization from aqueous ethanol, 10.8 g of the colorless benzhydrol derivative, m.p. 91°–94°.

EXAMPLE III

To a stirred slurry of 56 g of aluminum chloride in 150 ml of benzene under reflux was added dropwise 40 g of terephthaloyl chloride dissolved in 250 ml of benzene. When the addition was complete the reaction was refluxed for 15 minutes, cooled, and 250 ml of water was added slowly. The benzene layer was separated and the aqueous layer was extracted with methylene chloride (2×300 ml). The combined organic layers were washed with 1 M NaOH solution (2×400 ml) and water (400 ml), dried (MgSO$_4$), filtered, and the solvents were removed under reduced pressure to a nearly colorless solid. Recrystallization from 95% ethanol gave 46.8 g of colorless 1,4-dibenzoylbenzene, m.p. 160°–162°. Reduction of 20 g of this material with 1.8 g of sodium borohydride in 250 ml of ethanol gave 14.2 g of colorless 1,4-dibenzylolbenzene m.p. 142°–145°.

EXAMPLE IV 1,4-di(4'-t-butylbenzoyl) benzene was prepared as in Example III. From 28 g of aluminum chloride, 275 ml of t-butylbenzene, and 20 g of terephthalyl chloride then was obtained 11.8 g of the colorless material, m.p. 159°–161°. Reduction of 20 g of this material with 1.8 g of sodium borohydride in 250 ml of ethanol gave 16.1 g of colorless 1,4-di(4'-t-butylbenzylol) benzene, m.p. 156-158.

EXAMPLE V

A mixture of 37 g of chlorodiphenylmethane and 100 ml of water were refluxed under nitrogen for 16 hours. After cooling the water was decanted and 40 ml of ethanol was added to induce crystallization. The yellow solid was recrystallized 3 times from ethanol to give 21.9 g of dibenzhydryl ether, m.p. 108°–110°.

EXAMPLE VI

A mixture of 41.8 g of benzhydrol, 5.5 g of pentaerythritol, 30 ml of dimethylsulfoxide, 300 ml of toluene, and 0.6 g of p-toluenesulfonic acid were brought to reflux with water removal through a Dean-Stark trap. After 24 hours the toluene was removed under reduced pressure, the residual oil was taken up in methylene chloride (200 ml), washed with water (2 times 200 ml), dried (MgSO$_4$), filtered, and the solvent was removed under reduced pressure. The residual solid was purified by multiple extraction-recrystallization with methanol to give 13.8 g of pure tetrabenzhydryl pentaerythrityl ether, m.p. 135°–137°.

EXAMPLE VII

The additives were blended into polypropylene powder (Hercules Profax 6301) at 0.3% by weight concentrations, extruded into pellets, and then injection molded into 55 mil thick plaques and standard tensile bars. The molded samples were irradiated to a 10 Mrad dose with a cobalt-60 γ-ray source. The yellowness indices were determined on a Hunter Colorimeter (ASTM D 1925). Percentage elongation at break was used as a measure of embrittlement and was recorded on an Instron testing machine using a strain rate of 5 in./min. (ASTM D 638). This data for various additives is shown in Table II.

TABLE II

| Additive (0.3%) | Yellowness Index | % Elongation at Break |
| --- | --- | --- |
| none | 6.30 | 8.5 |
| benzhydrol | 3.16 | 21.9 |
| dibenzhydryl ether | 3.69 | 18.8 |
| tetrabenzhydryl pentaerythrityl ether | 4.36 | 24.0 |
| 4,4'-dimethylbenzhydrol | 5.68 | 33.6 |
| 4,4'-di-t-butylbenzhydrol | 3.81 | 22.5 |
| 1,4-dibenzylol benzene | 3.48 | 23.8 |
| 1,4-di(4'-t-butylbenzylol)benzene | 6.35 | 28.3 |
| Goodrite 3114 | 24.00 | 26.4 |
| Goodrite 3125 | 13.79 | 32.0 |

EXAMPLE VIII

Three samples containing benzhydrol with and without commercial synergistic antioxidants were prepared, irradiated, and tested as in Example VII. The test results are shown in Table III.

TABLE III

| Sample # | Additives (% Concentration) | | Yellowness Index | % Elongation at Break |
| --- | --- | --- | --- | --- |
| 1 | benzhydrol | (0.3%) | 3.16 | 21.9 |
| 2 | benzhydrol dilauryl thiodipropionate | (0.3%) (0.1%) | 4.97 | 32.2 |
| 3 | benzhydrol Weston 619 | (0.3%) (0.1%) | 3.90 | 31.5 |

EXAMPLE IX

Two samples containing Goodrite 3114 (a commercial phenolic antioxidant) were prepared, irradiated, and tested as in Example VII. The test results are shown in Table IV.

TABLE IV

| Sample # | Additives (% Concentration) | | Yellowness Index | % Elongation at Break |
| --- | --- | --- | --- | --- |
| 1 | Goodrite 3114 | (0.1%) | 11.55 | 19.6 |
| 2 | Goodrite 3114 benzhydrol | (0.1%) (0.3%) | 8.66 | 26.2 |

What is claimed is:

1. An olefinic polymer composition resistant to discoloration or degradation in physical properties when subjected to sterilizing amounts of radiation which consists essentially of an olefinic polymer selected from homopolymers and copolymers made from aliphatic, ethlenically unsaturated monomers containing from 2 to about 10 carbon atoms and from about 100 to about 10,000 ppm based upon the weight of the total composition of a stabilizer selected from:

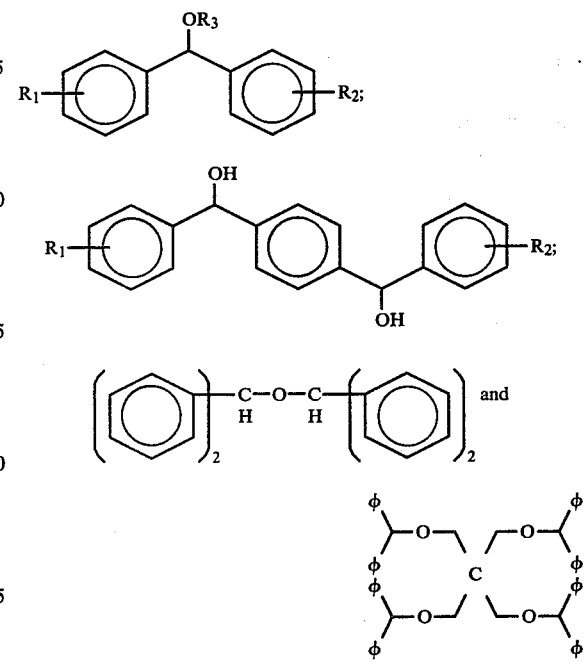

wherein R₁ and R₂ are independently selected from H or an alkyl group of the formula $C_nH_{2n+1}$ where n is from 1 to about 20; and R₃ is selected from hydrogen, an alkyl group having from 1 to about 20 carbon atoms, or an acyl group having from 2 to about 20 carbon atoms.

2. The olefinic polymer composition of claim 1 wherein said benzhydrol or benzhydrol derivative compounds are selected from the following compounds: benzhydrol; 4,4'-dimethylbenzhydrol; PO₂CHOCHPO₂; 4,4'-di-t-butylbenzhydrol; C(CH₂OCHPO₂)₄;

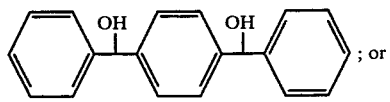

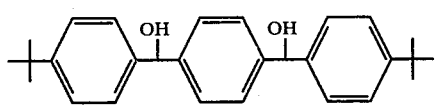

3. The olefinic polymer composition of claim 1 wherein said benzhydrol or benzhydrol derivative compound is provided as a primary stabilizer together with a secondary stabilizer in an amount of from about 100 to about 10,000 ppm based on the weight of the total composition.

4. The olefinic polymer composition of claim 1 wherein said benzhydrol or benzhydrol derivative compound is provided as a primary stabilizer and wherein the composition also includes at least one phenolic-type primary stabilizer in an amount of from about 100 to about 3,000 ppm based on the weight of the total composition.

5. The olefinic polymer composition of claim 1 wherein said olefinic polymer is selected from homopolymers of polypropylene and random or block copolymers of polypropylene with other mono-α-olefins containing up to 10 carbon atoms.

6. An additive package for an olefinic polymer composition resistant to discoloration or degradation in physical properties when subjected to sterilizing amounts of radiation, which consists essentially of a hindered phenolic primary stabilizer and another stabilizer selected from:

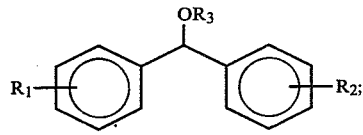

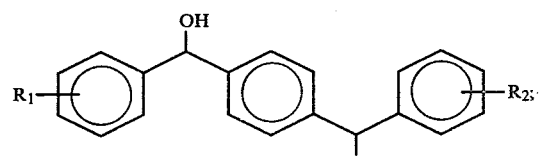

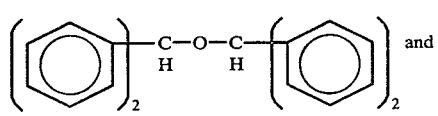

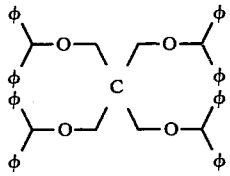

wherein R₁ and R₂ are independently selected from H or an alkyl group of the formula $C_nH_{2n+1}$ where n is from 1 to about 20; and R₃ is selected from hydrogen, an alkyl group having from 1 to about 20 carbon atoms, or an acyl group having from 2 to about 20 carbon atoms.

7. The additive package of claim 6 wherein said hindered phenolic primary stabilizer is provided in an amount of from about 100 to about 3,000 parts per million based on the weight of the total composition and said benzhydrol or benzhydrol derivative stabilizer is provided in an amount of from about 100 to about 10,000 parts per million based on the weight of the total composition.

8. A method for sterilizing a shaped article made from an olefinic polymer composition which comprises subjecting said shaped article to high energy radiation in an amount sufficient to sterilize said shaped article; said olefinic polymer composition comprising an olefinic polymer selected from homopolymers and copolymers made from aliphatic, ethylenically unsaturated monomers containing from 2 to about 10 carbon atoms and from about 100 to about 10,000 ppm based upon the weight of the total composition of a stabilizer selected from:

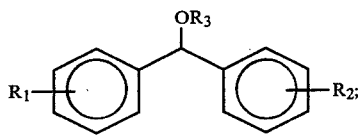

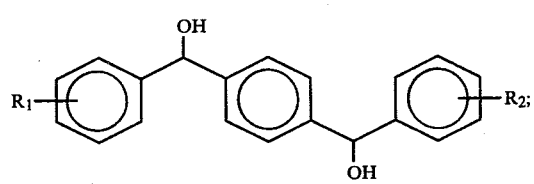

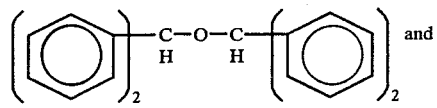

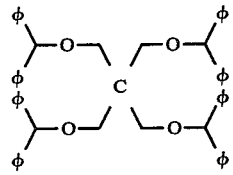

wherein R₁ and R₂ are independently selected from H or an alkyl group of the formula $C_nH_{2n+1}$ where n is from 1 to about 20; and R₃ is selected from hydrogen, an alkyl group having from 1 to about 20 carbon atoms, or an acyl group having from 2 to about 20 carbon atoms.

9. A process according to claim 8 wherein said high energy radiation is gamma radiation.

* * * * *